Nov. 28, 1967   J. R. SADIER   3,354,761
MACHINE-TOOL EMBODYING AUTOMATIC TOOL CHANGING MEANS
Filed April 12, 1965   3 Sheets-Sheet 1
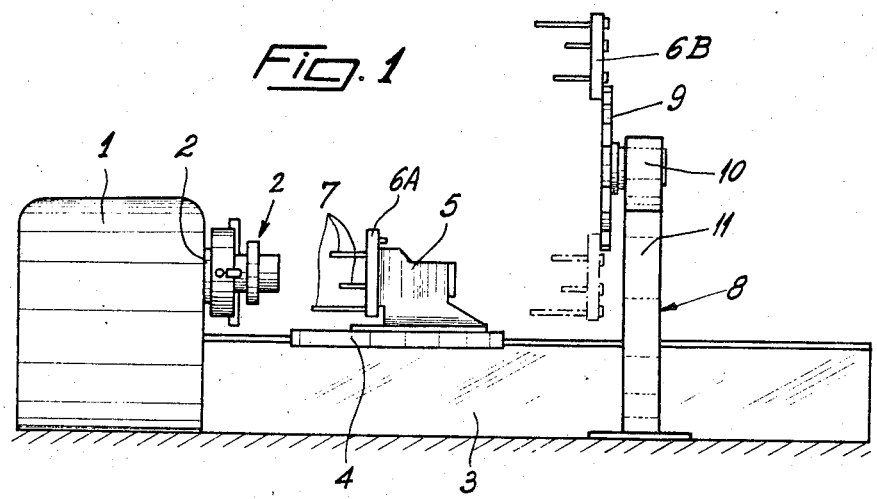
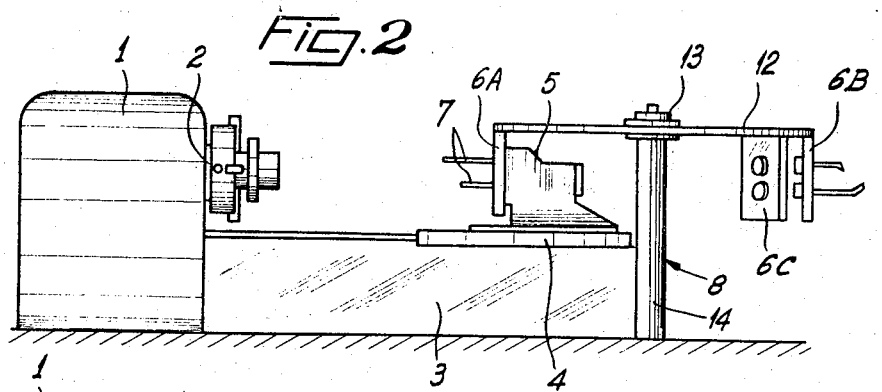
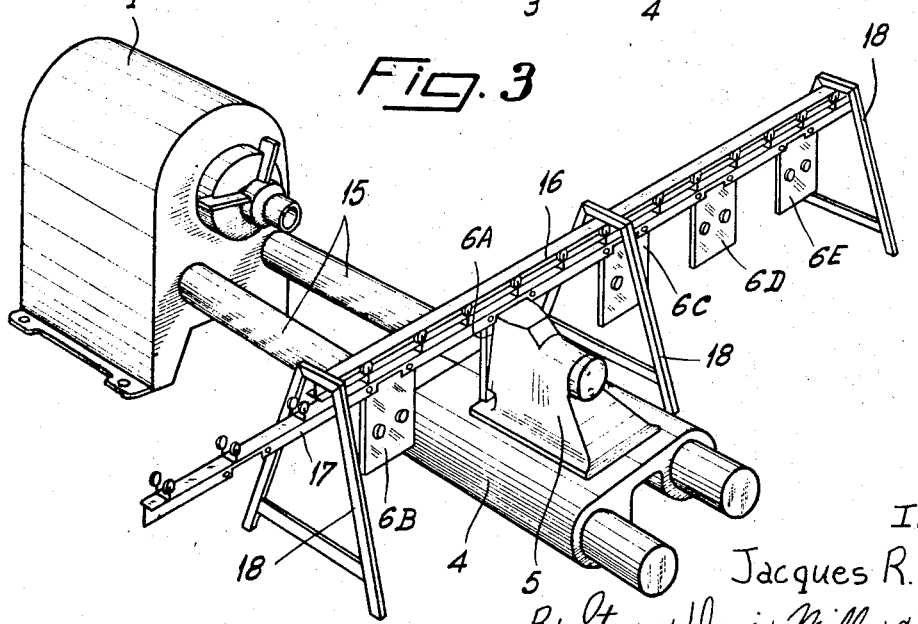
Inventor
Jacques R. Sadier
By Stevens, Davis, Miller & Mosher
Attorneys Nov. 28, 1967   J. R. SADIER   3,354,761
MACHINE-TOOL EMBODYING AUTOMATIC TOOL CHANGING MEANS
Filed April 12, 1965                                   3 Sheets-Sheet 2
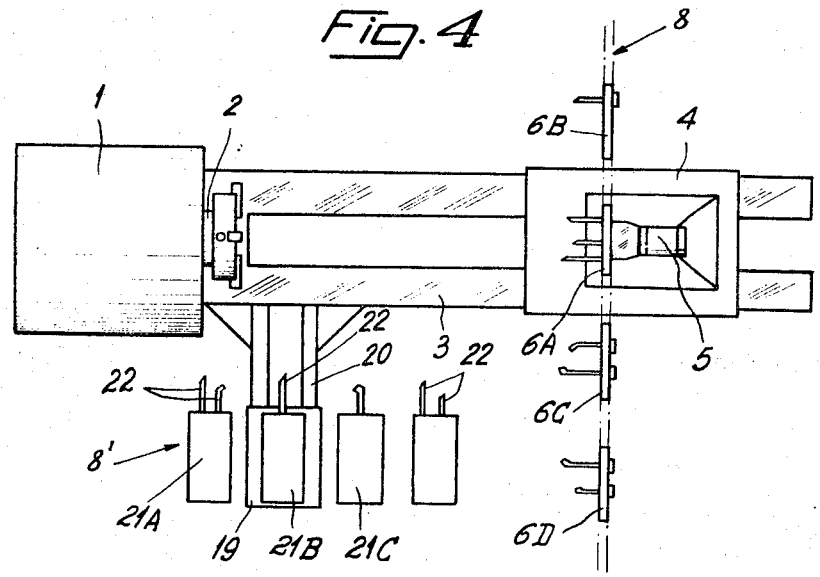
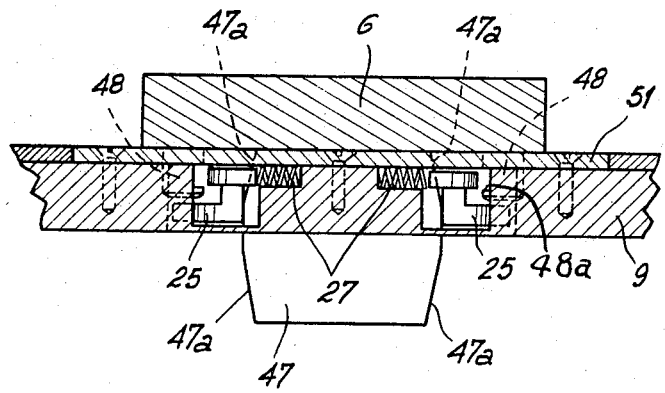
Inventor
Jacques R. Sadier
By Stevens, Davis, Miller & Mosher
Attorneys

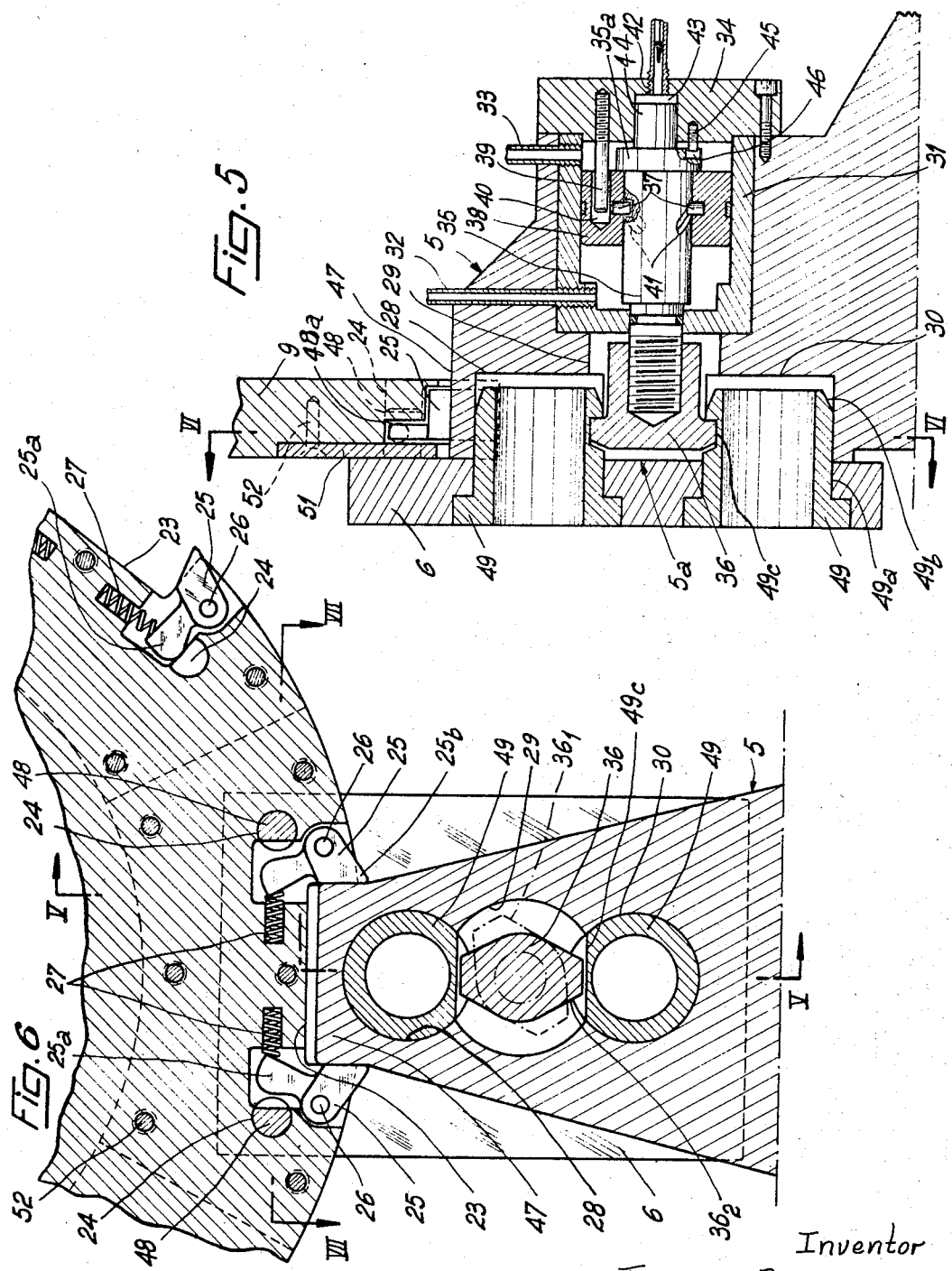

United States Patent Office 3,354,761
Patented Nov. 28, 1967

3,354,761
MACHINE-TOOL EMBODYING AUTOMATIC
TOOL CHANGING MEANS
Jacques R. Sadier, 23 Rue Achille Millien,
Nevers, Nievre, France
Filed Apr. 12, 1965, Ser. No. 447,383
Claims priority, application France, Apr. 24, 1964,
972,283
7 Claims. (Cl. 82—2)

ABSTRACT OF THE DISCLOSURE

A machine tool carriage reciprocable towards and away from a workpiece and adapted to carry off a tool-carrier unit supported by a stepwise displaced unit conveyor in its motion towards the workpiece, to reconnect said unit to the conveyor during the motion away from the workpiece, and then to carry off a further tool-carrier unit in the further motion towards the workpiece after a step of the conveyor.

---

In the gradual trend towards the automation of machining processes, it has been known for many years to provide a machine-tool with means for automatically changing the tool or tools that are to engage the work during a particular machining cycle.

Heretofore such means have generally taken the form of indexable turrets or equivalent structures, which are indexed, usually in rotation about a vertical axis, to present different tools or sets of tools to the work. Automatic tool changing means of this general type, though very widely used, possess serious limitations, foremost among which is their lack of flexibility.

The number of tools are sets of tools usable with such an arrangement during a given automatic cycle is limited to the number of sides of the turret, frequently six. This number may be too small or too large depending on circumstance, and in either case the arrangement will prove inconvenient and uneconomical. Furthermore, the rotation of the turret can only provide for the performance of a fixed and unchangeable repetitious cycle of automatic machining operations.

Extreme precision is required in the angular indexing of the turret, and this is complicated and expensive to achieve in view of the comparatively large size and heavy weight of the turret structure. In addition, and especially in the case of turrets indexable about a vertical axis, there is often a danger of the tools carried by the sides of the turret not in active position at a particular indexing step, projecting into the paths of motion of certain components of the machine-tool, such as cross slides movable transversely to the path of movement of the main slide carrying the turret, and thereby fouling other tools carried by such cross slides or otherwise interfering with the overall operation of the machine.

Objects of this invention are to provide automatic tool-changing means of a novel character which will inherently possess very great flexibility, will permit of performing automatic machining cycles including as many—or as few—steps as desired and of modifying any individual step of the cycle very simply as occasion may dictate; and will for these reasons be admirably suited for the performance of complex programmed operations in an automated machining shop. Other objects are to provide such means which will be simple and inexpensive to construct while ensuring a high degree of machining accuracy, and will also be flexible in its lay-out and economical of space so that the tool changing means can easily be so laid out as not to interfere with the motion of any of the components of the machine. Various additional objects and advantages will appear.

In an important aspect the invention provides a machine-tool comprising a tool carriage displaceable over a first path toward and away from a workpiece, and a conveyor device adapted to support an array of tool carrier units thereon and movable to convey said units over a second path generally intersecting said first path at a transfer station whereby to present any one of said units to said station. Means are provided which operate on movement of the carriage over said first path past said transfer station in one direction to transfer the unit at said station from the conveyor device to the carriage. Preferably, means are also provided which operate on carriage movement past the transfer station in the opposite direction to transfer a unit from the carriage back to the conveyor.

Exemplary embodiments of the invention will now be described for purposes of illustration but not of limitation with reference to the accompanying drawings, wherein:

FIG. 1 shows in simplified side elevation an engine lathe embodying a tool changing appliance according to one embodiment of the invention, in which the conveyor device is in the form of a vertical disk.

FIG. 2 is a similar view of another embodiment in which the conveyor device is a horizontal disk or turntable.

FIG. 3 is a partial perspective view of another modification in which the conveyor device is in the form of a rectilinear transverse monorail-like structure.

FIG. 4 is a plan view schematically illustrating a lathe embodying two tool-changing appliances according to the invention one for its longitudinal or end tool slide and another for a transverse or cross slide thereof.

FIG. 5 is a larger-scale view in sectional elevation showing a tool carriage and tool-changing conveyor constructed in accordance with the invention, more specifically in the embodiment of FIG. 1, at the instant of transfer of a tool carrier unit; this view being a section on line V—V of FIG. 6.

FIG. 6 is a view in section on line VI—VI of FIG. 5; and

FIG. 7 is a detail view in section on line VII—VII, FIG. 6.

Shown schematically in FIG. 1 is an automatic lathe including a frame with a head section 1 having a lathe spindle 2 journalled therein, a bench 3 and a tool carriage or slide 4 movable on longitudinal ways of the bench. Fitted on spindle 2 is a conventional work-supporting chuck assembly generally designated 2′. Upstanding from the slide 4 is a support member 5. Shown removably affixed to the side of the support 5 facing the lathe spindle and work is a tool-carrier unit 6A.

Tool-carrier unit 6A is one of a series of such units 6A, 6B, 6C and so on, any one of which is adapted to be interchangeably fitted to the tool-support 5 and automatically clamped thereto in a manner that will be made clear later. Each of the units 6 may itself be interchangeably or fixedly fitted with an assortment of tools which may be adapted for simultaneous engagement with the work for machining different (or the same) portions of the work simultaneously (in succession), said tooling assortments different from one tool-carrier unit to the other. In FIG. 1 the tool carrier unit 6A is shown provided with three tools 7 schematically illustrated, but it will be apparent that the respective units 6 may each be provided with only a single tool or any reasonable number of tools.

The series of tool carrier units 6A, 6B, etc. are adapted to be all supported in expectant position at a tool-changing or transfer station from a movable tool-changing appliance or conveyor generally designated 8. In the embodiment now being described the appliance 8 includes a stand 11 in the form of a two-legged gallows structure having its vertical uprights (only one of which is visible) positioned astride the lathe bench 3 and having a horizontal pivot shaft 10 journalled from the upper crossbeam of the gallows stand 11 about a longitudinal axis parallel to the axis of the lathe spindle 2 and in the same general vertical plane as it.

Secured for rotation with the pivot shaft 10 is a revolving disk 9. Means are provided for mounting the series of tool carrier units 6 around the periphery of the disk 9 in such a manner that as the slide 4 is made to recede along the bench 3 past the transfer station and to a position behind the appliance 8 the tool carrier unit such as 6A carried on the tool support 5 will be automatically transferred from said support 5 to a vacant location, at that time in lowermost position, of disk 9, and that the disk 9 can then be indexed in rotation to present another selected unit 6 to said lowermost position to be picked up by the support member 5 and latched in place thereon as the slide 4 thereafter advances on bench 3 past the transfer station towards its active position with respect to the work.

A preferred embodiment of said tool carrier mounting and transfer means will now be described with reference to FIGS. 5–7.

The periphery of disk 9 has a series of cutouts 23 formed in it in angularly equispaced relation, one of these cutouts and part of an adjacent one being shown in FIG. 6. Each of the tool carrier units 6 is supported from the disk 9 at a position generally registering with a related one of said cutouts. More specifically, each tool carrier unit 6, represented in FIGS. 5–7 by only its rectangular baseblock, when supported from disk 9 has its flat rear surface (the right hand surface in FIGS. 1 and 5) engaging the flat front surface of disk 9, with a pair of studs 48 of the tool carrier base block 6 projecting into corresponding holes 24 formed in the disk 9 near opposite sides of the cutout 23. As shown in FIG. 6 only a relatively small inner portion of the rectangular contour of unit 6 is in engagement with a marginal portion of the disk surface surrounding the cutout 23. The unit 6 is latched in this position by means of a pair of latch levers 25 pivoted by pivot pins 26 to the disk 9, said latch levers being located in recesses of the disk connected with the opposite sides of the cutout 23. Each of the latches 25 includes two angularly related legs 25a and 25b. Compression springs 27 seated in sockets of the disk 9 engage the latch legs 25a so as to tend to rotate the latches 25 about their pivots 26 to the positions shown in connection with the latching means illustrated at the right of FIG. 6. In this position it will be noted that the latch leg 25a penetrates across the circular contour of the related bore 24 while its other leg 25b is positioned across the related end contour of cutout 23. The studs 48 of each unit 6 have sawcuts 48a formed in their sides, so that when said studs 48 are engaging the bores 24, the latches 25 are spring-urged to positions in which their legs 25a enter said sawcuts, and cooperate with the latch legs 25b to latch the tool-carrier units 6 in position on the disk 9. It will be noted that sector shaped cover plates 51 are secured in shallow recesses of disk 9 at the front or left side thereof by means of screws 52 to cover partly the cutouts 23 and protect the latching mechanism against exterior agents and dirt.

With the arrangement just described the tool carrier units 6 are normally attached and latched to the periphery of disk 9, but it will be understood that if a separating outward force is applied to the legs 25b of both latches 25 associated with a tool carrier unit 6 supported from the disk and a leftward push is simultaneously exerted on the right side of said unit 6, then this unit will be released from disk 9 and can be transferred to the tool carriage 5. This operation is performed by the tool carriage 5 as it advances leftward from its rearmost position.

As shown in FIGS. 5 and 6 the tool carriage support member 5 has three overlapping cylindrical bores 28, 29, 30 formed in its left-hand or front surface, with the axes of all three bores in a common vertical plane. The upper and lower bores 28 and 30 are adapted to receive respective cylindrical bushes 49 secured in the tool carrier unit 6 and projecting rearward (rightward) therefrom. The bushes 49 are tapered at their rear ends 49b to facilitate entry into the bores 28 and 30. With the bushes 49 pushed home into the bores 28 and 30, the first flat rear surface of unit 6 engages the flat front face 5a of tool carriage 5 and the tool carrier unit 6 is firmly supported from carriage 5. It is firmly locked and clamped in this position by means to be presently described.

For the purpose of releasing the latches 25, the tool carriage 5 is provided with an upwardly projecting head portion 47 which is adapted to be freely received in any cutout 23 of the disk as shown in FIG. 6. To facilitate entry of the head portion 47 through the cutout 23 in either direction of motion, the head portion 47 is tapered at both front and rear ends in horizontal contour, thereby providing the camming tapers or ramps 47a seen in FIG. 7.

With the arrangement just described, it will be evident that as carriage 5 approaches the tool changing appliance 8 from the rear (i.e. carriage 5 moving leftward as in FIGS. 1 and 5), its camming head 47 will enter the cutout 23 of disk 9 located at the lowermost position, and in so doing the camming ramps 47a will push apart the latch legs 25b to rotate the latches 25 against the force of springs 27 and unlatch the tool carrier unit 6 from the disk 9. Simultaneously the tapered bushes 49 of the unit 6 will enter the bores 28 and 29 of carriage 5 and the unit 6 is thus transferred from disk 9 to carriage 5 as the latter pursues its leftward movement over bench 3.

Conversely, when carriage 5 with a tool unit 6 thereon is moving rearward or rightward to approach the tool changing appliance 8 from the front, the unit 6 is transferred from carriage 5 to the vacant lowermost location on disk 9 by a generally similar but reverse procedure. That is, the rear camming ramps 47a of the carriage camming head 47 push apart the latch legs 25b against the restraint of springs 27, thereby permitting the studs 48 of the unit 6 to enter the bores 24. As the carriage 5 continues its rearward or rightward movement, the means, previously referred to, which clamp the unit 6 to carriage 5 are released as will be described, and the tool-carrier unit 6 is released from the receding carriage 5 and remains attached to disk 9, and is latched thereto by the latch levers 25 as the legs 25b thereof are disengaged by the camming ramps 47a of the carriage.

The means for locking and clamping the tool carrier unit 6 to carriage 5 will now be described. As shown in FIGS. 5 and 6, the bushes 49 have sawcuts 49c formed in their sides that are directed towards each other, and a locking head 36 of the oblong shape shown in FIG. 6 is supported from the carriage 5 in a manner to be presently described and is adapted to project into the intermediate one 29 of the three aligned bores formed in unit 6 when said unit is engaged by the carriage, for cooperation with said sawcuts. Locking head 36 is rotatable between two angular positions, in one of which, as shown in full lines at $36_2$ in FIG. 6 its opposite ends are received in said sawcuts to lock the unit 6 to the carriage, while in the other position $36_1$ shown in dot-dash lines, the locking head disengages both sawcuts 49c so as to release the unit 6 from its locked condition with respect to carriage 5.

Locking head 36 is secured, e.g. by the threaded engagement shown, to the forwardly projecting end of a shaft 35 which is supported for rotation and limited axial displacement in a pressure-fluid cylinder 31 fitted in a recess formed in the rear side of carriage 5. The cylinder 31 is sealed at its rear end by a screwed-on cover plate 34. An annular piston 38 is slidable in cylinder 31 around the shaft 35 and is prevented from rotation therein by a rod 39 projecting from cover plate 34 into a longitudinal blind hole 40 formed in the rear face of piston 38. The annular piston 38 has a pair of diametrically-opposed fingers 37 projecting inwardly from its inner periphery into respective grooves 41 in the form of opposed helical segments formed in the cylindrical periphery of shaft 35. Shaft 35 has a collar portion 35a of enlarged diameter whose forwardly directed surface is engageable with the rear face of annular piston 38, while the rearward surface of collar 35a has a small socket 46 formed in it. A screw stud 45 projecting from cover plate 34 is adapted to enter socket 46 as the shaft 35 recedes from its foremost axial position in the cylinder, provided the angular position of said shaft at that time is the angular position in which the locking head 36 occupies the locking position $36_2$ shown in full lines in FIG. 6. Shaft 35 further includes a cylindrical shank portion 44 behind collar 35 which operates as a plunger in a cylindrical recess 43 formed in cover plate 34.

A pressure fluid line 42 is connected with cover plate 34 and opens into the bottom of recess 43 behind the plunger shank 44 of shaft 35. Line 42 is in operation permanently connected with a source of pressure fluid, e.g. liquid, to bias the shaft 35 and with its annular piston 38 in a forward direction in the cylinder 31. Two further fluid lines 32 and 33 connect with the opposite ends of cylinder 31 respectively forward and rearward of piston 38 and are selectively connectable to the pressure source and exhaust through the usual valve means not shown.

In operation, when tool carriage 4–5 is positioned on bench 3 rearwardly beyond (to the right of) tool-changing conveyor 8, and therefore does not carry a tool carrier unit 6 thereon as earlier explained, the assembly including shaft 35 and annular piston 38 occupies a foremost position in cylinder 31 under the action of the biassing pressure applied through line 42. Lines 32 and 33 are at this time connected to exhaust. The front face of piston 38 abuts a rearwardly directed annular shoulder which is shown in FIG. 5 near the front end of cylinder 31. The rear face of piston 38 is out of engagement with shaft collar 35a. Shaft 35 is rotated to an angular position in which locking head 36 assumes the releasing position $36_1$. Consequently, as the carriage 5 advances and passes through the cutout 23 in lowermost position in disk 9, the tool unit 6 in that position can be transferred in the manner previously described to the carriage 5 this transfer being permitted owing to the locking head 36 being rotated to the releasing position $36_1$ as just indicated. As the carriage 5 advances past the disk 9, automatically operated valve means, not shown, act to connect the front fluid line 32 with the pressure source. The pressure thus applied to the front end of cylinder 31 displaces the piston 38 relatively to cylinder 31 and shaft 35 in the rearward direction, while shaft 35 retains its foremost position owing to the biassing pressure which continues to be applied from line 42 to its rear end. Due to the coaction of fingers 37 and helical grooves 41, the relative movement of piston 38 acts to rotate shaft 35 so that locking head 36 assumes the full line locking position $36_2$ in which its ends engage the sawcuts 49c to lock tool unit 6 in position with respect to carriage 5. During the rearward motion of the piston 38, as the face of the piston abuts collar 35a, it tends to carry spindle 35 with it in its rearward axial displacement, due to the larger effective area of the annular piston 38 as compared to the rear end face of plunger shank 44 exposed to the biassing pressure from line 42. At this time, assuming the locking head 36 has actually been rotated to its proper locking position $36_2$, socket 46 registers with stud 45 and rearward movement of shaft 35 with piston 38 is permitted. The shaft and piston are thus shifted bodily to a rearmost position in which the tool carrier unit 6, in addition to being locked in position on carriage 5, is firmly clamped thereon with the rear flat face of its rectangular supporting block firmly engaging the front flat face 5a of the carriage 5 under the action of the fluid pressure, permitting the machining operations to be properly performed. If however for any reason the locking head 36 has not been fully rotated to its locking position, due for instance to an incorrect transfer of the tool unit 6 from disk 9 to the carriage in the first place, stop 45 is abutted by a solid portion of collar 35a and rearward movement of the shaft 35 is prevented. Should this condition arise, suitable safety means of conventional character, not shown, may be actuated to arrest the power displacement of tool slide 4 and/or operate an alarm.

After the prescribed machining operation using the tool carrier unit 6 thus attached to carriage 5 have been completed and during the subsequent receding movement of the carriage, the fluid pressure is automatically cut off from line 32 substantially at the time that the studs 48 of the unit 6 enter the bores 24 in disk 9 as earlier described. The biassing pressure from line 42 acting on the rearmost end of shaft 35 now initiates a forward bodily displacement of the shaft and piston relative to the cylinder, relieving the pressure that was clamping the unit 6 in position of carriage 5. At the same time line 33 is connected with the pressure source, causing a positive forward displacement of piston 38 relative to shaft 35. Due to the constraint present between its helical grooves 41 and fingers 37, the shaft is rotated until the locking head 36 has assumed its unlocking position $36_1$, releasing the tool carrier unit 6 for complete transfer to the disk 9, and allowing it to be latched to the disk by the action of latches 25 as earlier described.

It will thus be apparent that the means described above make it possible very simply to transfer tool carrier units 6A, 6B, 6C, etc., from tool carriage 5 to tool changing disk 9 after completion of machining operations performed with a particular one of said units, and from disk 9 to the tool carriage for the performance of prescribed new machining operations. The tool changing disk 9 may be indexed to successive positions every time the carriage 5 has been moved to its rearmost position behind the disk 9, so as to present the particular tool carrier unit 6 it is desired to use next. The indexing of disk 9 may be manually controlled if desired, but advantageously the indexing operations are controlled automatically. For example, simple and conventional valve or switch means may be provided on the bench 3 for actuation by slide 4 as it approaches or reaches its rearmost position for controlling a pressure-fluid or electrical power circuit which will index the disk 9 to its next position. This next position may be the angular position next in line, in which case the disk 9 would be intermittently rotated always in the same direction, or may be some other position selected in accordance with a sequencing programme.

In the modified embodiment shown in FIG. 2, the lathe illustrated is similar to the one shown in FIG. 1. In this case the tool changing conveyor appliance generally designated 8 includes a horizontal tool-changing disk or turntable 12 instead of the vertical-disk earlier described. Turntable 12 is pivoted at its centre at 13 on the top of a vertical column 14 which is positioned beyond the rear end of lathe bench 3 with its geometrical axis in the vertical plane of symmetry of the lathe, i.e. the same vertical plane as that of the lathe spindle. The tool carrier units 6A, 6B, etc. are suspended from the periphery of disk 12 through means not shown in detail but which may be very similar to the means described with reference to FIGS. 5–7 and would include pairs of spring latching levers similar to the latches 25, actuated by the camming means 47a formed on the upwardly projecting head 47 of the carriage 5. The tool carriage assembly 5 used in the embodiment of FIG. 2 may itself be similar and indeed identical with that described with reference to FIGS. 5–7, including the hydraulically operated means for locking and clamping the tool carrier units 6 to the carriage 5. It will be evident that in the operation of this embodiment the disk or turntable 12 would be indexed about its vertical axis every time the carriage 5 has deceded to its rearmost position on bench 3 so as to present a fresh unit 6A to the foremost position as shown in FIG. 2, for transfer to carriage 5.

In the further modification shown in FIG. 3, the lathe shown differs from the showings of FIG. 1 or FIG. 2 in that the tool carriage 4–5 is in this case adapted for longitudinal sliding movement on a pair of cylindrical guide bars 15 projecting from the lathe head section 1. It will be understood however that this difference is not essential, and that the tool changing means to be described with reference to FIG. 3 may be readily used with lathe constructions of the type shown in FIGS. 1 and 2, and conversely the tool changing means of either FIG. 1 or FIG. 2 may be used with lathes constructed as in FIG. 3.

In the embodiment of FIG. 3 the tool changing appliance comprises a horizontal rail 16 in the form of an I-section supported from trestles 18 and extending transversely to the direction of the lathe spindle above the carriage guides 15. Suspended from rail 16 for displacement with respect to it is a beam 17 shown as a T-section provided with a series of spaced pairs of rollers rotatably mounted on the upper flange surface thereof and engaging the upper surfaces of the lower flanges of the fixed rail 16, so as to be movably suspended therefrom in monorail relationship. The downwardly directed web of beam 17 is formed with spaced rectangular cutouts (analogous to the cutouts 23 of FIGS. 5–7) and in a position corresponding to each cutout a tool carrier 6A, 6B, 6C, etc is releasably attached to the beam 17. The means for releasably attaching the tool carrier units to beam 17 may be very similar and in fact virtually identical with the means described with reference to FIGS. 5–7 in the case of the vertical tool changing disk 9. The internal mechanism of tool carriage 5 may also be quite similar to that described with reference to those figures. The only difference is that in this modification of FIG. 3 the indexable tool changing member constituted by beam 17 is displaced between its indexing positions in horizontal translation rather than in rotation about an axis.

In another modification, not illustrated but readily understandable with reference to FIG. 3, the rigid beam 17 may be replaced with an articulated beam consisting of a series of interpivoted sections and constituting a chain. If desired, such a chain can be formed into an endless chain conveyor mounted on end pulleys or sheaves. Alternatively, in the embodiment of FIG. 3 means may be provided for manually or automatically feeding fresh tool carrier units 6 to one end of the conveyor beam 17 from a store of such units.

FIG. 4 illustrates in schematic plan view the possibility of associating with a single machine-tool such as a lathe similar to the one shown in FIGS. 1–2 or the one shown in FIG. 3, two separate tool-changing systems each in accordance with the invention. One of these systems is generally designated 8 and is associated with the longitudinal tool carriage 4–5 for the selective transfer to and from said carriage of the tool carrier units 6A, 6B, 6C, etc., in the manner earlier described. The tool changing system 8 may be generally similar to the one described in any of the previous embodiments, and for clarity its general layout is that described with reference to FIG. 3.

In addition, the lathe shown in this embodiment is equipped with a second, transverse tool or cross slide 19 slidable on fixed ways 20 extending transversely to the lathe spindle from bench 3. The transverse tool carriage 19 is adapted to receive thereon any one of a second series of tool carrier units 21A, 21B, 21C, etc., each provided with one or more tools of different character 22. The units 21 are transferred to and from the lateral carriage 19 by means of a tool changing system according to the invention generally designated 8', not shown in detail. The system 8' may be generally similar in character to any of the systems 8 above disclosed, viz, it may include a vertical disk, a horizontal turntable or a traversable beam or a chain. The tool carrier units 21 have been schematically shown as including generally horizontal baseblocks attachable to an upper surface of the carriage 19, but it will be understood that this is only exemplary and that the tool carrier units 21 may be similar to the units 6 including vertically disposed baseblocks attachable to a vertical front surface of the carriage 19. The means for transferring the tool carrier units 21 between the tool changing appliance 8' and the lateral tool carriage 21 may be generally similar or identical with the means described with reference to FIGS. 5–7.

It will also be understood that if desired, another tool changing appliance according to the invention may be provided in conjunction with another lateral tool carriage not shown on the opposite side of the machine tool. Or the tool changing appliance 8 associated with the longitudinal tool carriage 4–5 may be omitted and only one or more tool changing appliances such as 8' may be provided.

It will be apparent from the foregoing disclosure that the invention has provided a novel form of automatic tool changing appliance which may be incorporated in machine-tools of a variety of types, in addition to the engine lathes shown, with suitable minor modifications depending on the lay-out of the machine-tool.

Inasmuch as the tool carrier units are transferred from (and to) an indexable conveyor device to (and from) the tool support ofthe machine-tool, in accordance with the basic feature of the invention and in contrast to the conventional arrangement wherein the tool unit remains on the indexable structure, such as a turret, throughout the machining operations, the improved arrangement inherently possesses greatly increased flexibility.

The number of tool units involved in an automatic cycle is virtually unlimited since the number of such units supportable on the conveyor devices used in the invention can be very much larger than the number of units supportable on a turret or similar structure; moreover, as earlier mentioned, if desired the conveyor can easily be replenished with additional tool units from a store, manually or automatically, especially when using the chain type structure of the type shown in FIG. 3.

The invention makes it possible to subdivide a given machining process into a great many more partial cycles, steps or stages than were heretofore feasible, thereby making it possible, inter alia, to separate in a positive manner machining steps which if performed simultaneously might interfere with one another, thus improving the accuracy of machining. Another advantage of such subdivision is the reduction of the volume of cuttings or chips produced at a given time, a frequent source of trouble in automatic machining processes.

The machining of extremely complex parts is rendered possible in a continuous automatic cycle. The flexibility of a series production process is increased in that parts of more than one shape and size can be machined as a common series, through the possibility of substituting tool carrier units in the array carried on the conveyor of the invention. Initial adjustment as well as tool-sharpening or grinding operations are also facilitated. The use of the separate tool carrier units also facilitates automatic programming operations in which program selector means are associated with the rsepective tool carrier units.

The basic idea of the invention whereby individual tool carrier units are transferred from an indexable conveyor device to a tool support of the machine-tool prior to machining operations (and back from the carriage to the conveyor on completion of the operations), rather than remaining fixed to an indexable conveyor device such as a turret throughout the machining operations, also has the important advantage of greatly reducing the precision required of the indexable structure. It will be clearly obvious that in all of the embodiments disclosed herein, there is no need whatever for the tool carrier units to be suspended from the conveyor with any high degree of accuracy, nor do the indexing displacements of the conveyor require to be at all accurate. In fact the tool carrier units presented to the transfer station by the conveyor may be positioned very imprecisely while still enabling the transfer operation to be correctly carried out. This lack of precision does not affect the accuracy of the final machining operations which depends only on the degree of accuracy with which the tool carrier unit is locked and clamped in its final position on the tool carriage.

What I claim is:

1. In a machine-tool the combination comprising means supporting a workpiece; a tool carriage displaceable over a first path towards and away from the workpiece; conveyor means having a series of supporting locations and movable to convey said locations over a second path generally intersecting said first path at a transfer station; a plurality of different tool carrier units; first engaging means on each of said units and cooperating first engaging means at each location of the conveyor means interengageable for removably supporting any one of said units at any one of said locations; second engaging means on each of said units and cooperating second engaging means on said carriage interengageable for removably affixing any one of said units to said carriage; said second engaging means being interengageable on movement of the carriage over said first path past the transfer station in one direction to transfer the unit at said station from the conveyor means to the carriage; means for firmly clamping the transferred unit with respect to the carriage; latching means at each location of the conveyor means associated with said first engaging means for releasably latching a unit to said conveyor means; and camming means on said carriage engageable with said latching means on movement of the carriage past the transfer station for actuating the latching means to a releasing position.

2. In a machine-tool the combination comprising:
means supporting a workpiece;
a tool support displaceable toward and away from the workpiece and having a tool carrier-supporting surface;
a conveyor including a series of supporting locations and movable to convey said locations to present any one thereof to a transfer station adjacent the path of travel of the tool support;
a plurality of tool carrier units each having a surface matable with said surface of the tool support;
first engaging means on each of said units and cooperating first engaging means at each conveyor location, interengageable for removably supporting said units at said locations, including means for latching said units in supported condition;
second engaging means on each of said units and cooperating second engaging means on the tool support, interengageable for removably affixing any one of said units to said tool support;
camming means on the tool support engageable with said latching means on the conveyor on carriage movement past the transfer station for releasing the unit supported thereat for transfer to the tool support, whereupon said unit will be affixed to the tool support through inter-engagement of said second engaging means with said surfaces of the unit and tool support in mating relation; and
force-developing means on the tool suppor operable on transfer of a unit thereto for forcibly locking said mating surfaces in their mated relation.

3. The combination defined in claim 2, wherein said force developing means comprises a pressure fluid actuator device.

4. The combination defined in claim 2, including a locking member on the tool support rotatable and axially displaceable between a locking position in which said member engages said unit and forcibly presses said surfaces into mating engagement and a releasing position, and power means for imparting said displacements to said member between its positions.

5. The combination defined in claim 4, including a pressure fluid actuator in said tool support, a shaft extending axially through the cylinder for axial displacement and rotation relative thereto and carrying said locking member at one end thereof, an annular piston non-rotatably slidable in the cylinder and surrounding the shaft, interengaging means on the annular piston and shaft for imparting said axial displacement and rotation to the shaft on sliding displacement of the piston, and pressure fluid means connected with the cylinder for imparting sliding displacement to the piston.

6. The combination defined in claim 5, including pressure means biassing the shaft in an axial direction to move said locking member towards said releasing position, interengageable abutting means on the piston and shaft limiting shaft displacement relative to the piston in the said axial direction, said pressure fluid means connected with the cylinder being capable of overcoming said biassing means for imparting a bodily axial displacement to the piston and shaft in the reverse axial direction to press said surfaces forcibly into mating engagement.

7. The combination defined in claim 6, including means preventing axial displacement of the shaft in said reverse direction unless the shaft has been rotated to an angular position in which the locking member is in locking engagement with said unit.

References Cited
UNITED STATES PATENTS

| 3,073,024 | 1/1963 | Hutchens et al. | 29—568 |
| 3,074,147 | 1/1963 | Miller et al. | 77—25 X |
| 3,186,085 | 6/1965 | Coate | 29—568 |
| 3,186,266 | 6/1965 | Coate | 29—568 |

WILLIAM W. DYER, Jr., *Primary Examiner.*

LEONIDAS VLACHOS, *Examiner.*